US006983850B2

(12) United States Patent
Olson et al.

(10) Patent No.: US 6,983,850 B2
(45) Date of Patent: Jan. 10, 2006

(54) HYDROCYCLONE ROPING DETECTOR AND METHOD

(75) Inventors: Timothy J. Olson, Tucson, AZ (US); Roger J. Waterman, Tucson, AZ (US)

(73) Assignee: Krebs Engineers Corporation, Tucson, AZ (US)

( * ) Notice: Subject to any disclaimer, the term of this patent is extended or adjusted under 35 U.S.C. 154(b) by 0 days.

(21) Appl. No.: 10/603,994

(22) Filed: Jun. 25, 2003

(65) Prior Publication Data

US 2005/0016903 A1 Jan. 27, 2005

(51) Int. Cl.
*G01H 1/12* (2006.01)
*B04C 5/14* (2006.01)

(52) U.S. Cl. ...................... 209/720; 209/726; 209/727; 210/85; 210/512.1; 73/587

(58) Field of Classification Search ................ 209/715, 209/720, 725, 726, 727, 154; 210/85, 512.1, 210/788; 73/587, 589, 660, 662
See application file for complete search history.

(56) References Cited

U.S. PATENT DOCUMENTS

| | | | | |
|---|---|---|---|---|
| 2,648,433 | A * | 8/1953 | Wright et al. | 209/726 |
| 2,971,896 | A * | 2/1961 | Curl | 202/160 |
| 3,114,510 | A | 12/1963 | McCarty et al. | |
| 3,145,935 | A * | 8/1964 | Wilson | 241/24.1 |
| 3,358,938 | A * | 12/1967 | Brown | 241/21 |
| 4,246,576 | A | 1/1981 | Grieve et al. | |
| 4,441,102 | A * | 4/1984 | Webb | 340/673 |
| 4,670,161 | A * | 6/1987 | Hayatdavoudi | 210/739 |
| 5,248,442 | A | 9/1993 | Hulbert | |
| 6,601,005 | B1 * | 7/2003 | Eryurek et al. | 702/104 |

* cited by examiner

*Primary Examiner*—Donald P. Walsh
*Assistant Examiner*—Joseph C. Rodriguez
(74) *Attorney, Agent, or Firm*—Antonio R. Durando; Quarles & Brady Streich Lang LLP

(57) ABSTRACT

An ultrasonic sensor is mounted on the splash skirt at the underflow outlet of a hydrocyclone to detect a change in the underflow discharge from the normal conical shape in which the discharge impacts upon the splash skirt to a more cylindrical shape associated with roping.

3 Claims, 5 Drawing Sheets

HYDROCYCLONE ROPING DETECTOR AND METHOD

BACKGROUND OF THE INVENTION

1. Field of the Invention

This invention pertains generally to hydrocyclones and, more particularly, to the detection of a condition known as roping in the underflow discharge of a hydrocyclone.

2. Description of the Prior Art

When a hydrocyclone employed, for example, in the classification of solids is operating normally, a coarser-solid slurry is discharged through the underflow outlet at the bottom of the separation chamber and a finer-solid slurry is discharged through the overflow outlet at the top. The underflow discharge normally exits from the apex at the bottom of the chamber in the form of a conical spray with an included angle greater than about 20 degrees. A splash skirt is used below the apex of the hydrocyclone to contain and direct the flow downward and to reduce splashing and misting.

As defined in the art, roping occurs when the amount of solids reporting to the underflow outlet increases to the point where the discharge rate through the apex limits the flow. As a result, the coarse solids begin to build up in the separation chamber and pass through the overflow, the internal air core in the separation chamber collapses, and the underflow discharge becomes a tight cylinder or rope of coarse material. If this roping condition is not corrected, the underflow can plug off completely, and the cyclone will pass the entire flow through the overflow.

Normal discharge and roping are illustrated in FIGS. 1A and 1B, respectively.

In closed-circuit grinding applications, the cyclone underflow density is preferably kept high so that a minimum amount of water accompanies the coarse solids. That is done by sizing the apex, or orifice, to limit the flow to the solids plus no more than about 50% water. If the apex is too large, more water will report to the underflow with a large quantity of fine solids entrained in it. If sent back to the mill, those fine solids will limit classification efficiency as well as new feed capacity.

Most plants have a number of operating and standby cyclones which are brought into and out of operation with automated valves operated from a control room. With variable tonnages and ore hardness, it is difficult to operate the cyclones with maximum underflow density and at the same time avoid roping and the problems associated with it.

Heretofore, there have been some attempts to avoid the problem of roping by monitoring the angle of the underflow discharge stream to determine whether it is within predetermined limits. Examples of this approach are found in U.S. Pat. No. 3,114,510 and No. 4,246,576. In addition, U.S. Pat. No. 5,248,442 discloses a system in which information about the underflow shape is combined with data about the flow rate and density of the feed stream to provide information about the feed stream, the underflow stream or the overflow stream.

SUMMARY OF THE INVENTION

It is, in general, an object of the invention to provide a new and improved roping detector and method for hydrocyclones.

Another object of the invention is to provide a roping detector and method of the above character which overcome the limitations and disadvantages of the prior art.

These and other objects are achieved in accordance with the invention by providing a roping detector and method in which a sensor is mounted on the splash skirt at the underflow outlet of a hydrocyclone to detect a change in the underflow discharge from the normal conical shape in which the discharge impacts upon the splash skirt to a more cylindrical shape associated with roping.

Various other aspects of the invention will become clear from its description in the specification that follows and from the novel features particularly pointed out in the appended claims.

DETAILED DESCRIPTION OF THE INVENTION

Figure 1A:
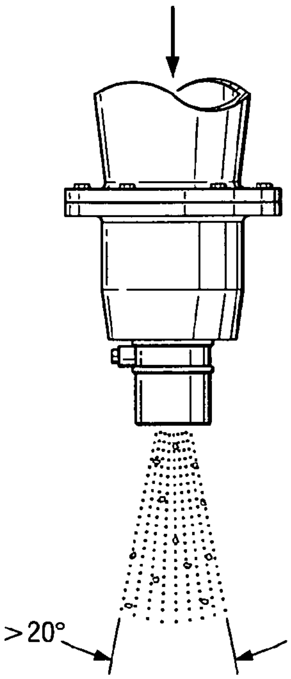
FIG. 1A (PRIOR ART)
FIGS. 1A and 1B are fragmentary elevational views illustrating a normal condition and roping in the underflow discharge of a hydrocyclone without the splash skirt.
Figure 1B:
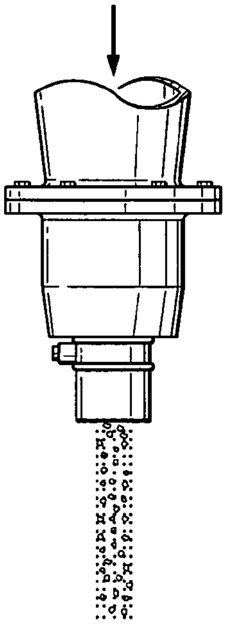
FIG. 1B (PRIOR ART)
Figure 2:
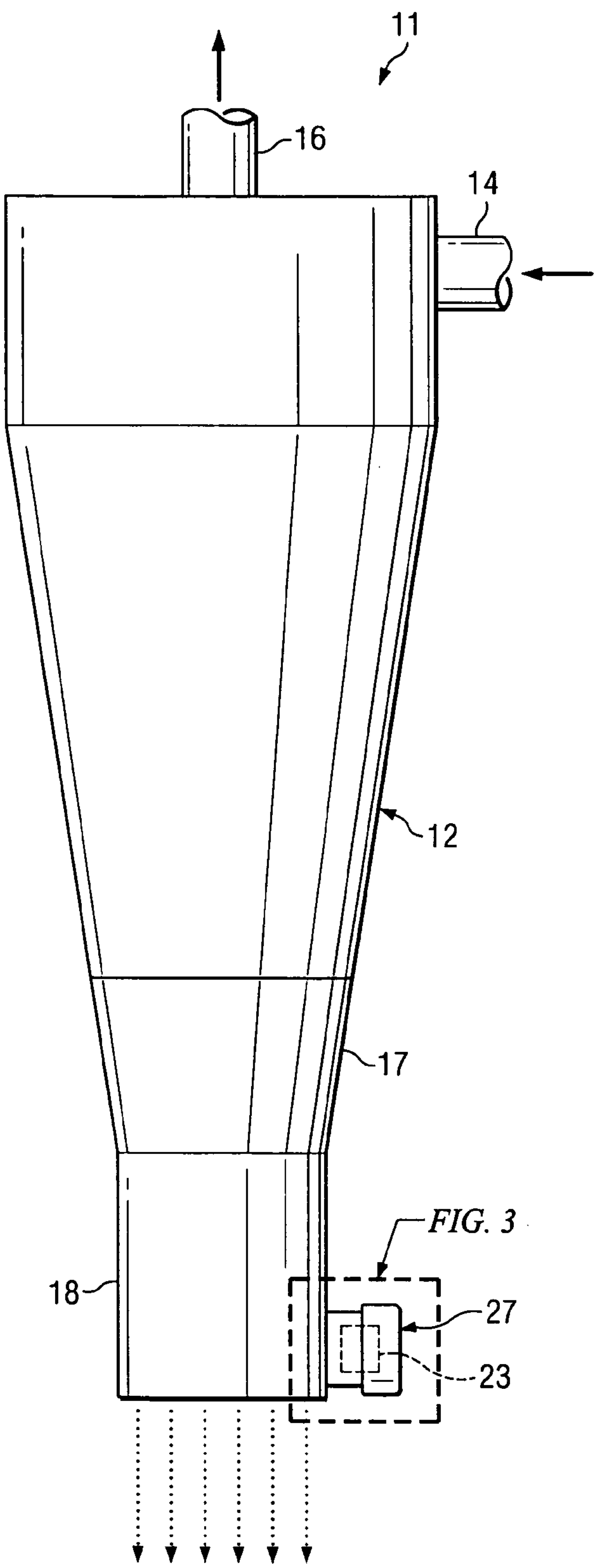
FIG. 2 is a side elevational view of one embodiment of a hydrocyclone with a roping detector in accordance with the invention.

In FIG. 2, the roping detector of the invention is illustrated in conjunction with a hydrocyclone 11 having a body 12 in which a conical separation chamber is formed. A feed inlet 14 directs a slurry to be processed into the upper portion of the chamber along a tangential or volute path, and an overflow outlet 16 is provided at the upper end of the chamber. A conically tapered apex section 17 is connected to the body at the lower end of the separation chamber and a splash skirt 18 is connected to the apex section. The splash skirt has a cylindrical side wall 19 and a liner 21 (shown in FIG. 3).

A sensor 23 is mounted on the lower portion of the side of the splash skirt to detect the onset of a roping condition in the underflow discharge. In one presently preferred embodiment, the sensor is an ultrasonic sensor with a peak frequency response at about 40 KHz, a dynamic range of about 40 decibels, and an output current which is proportional to the ultrasonic signal detected. One suitable sensor is the UE Ultra-Track 750 from UE Systems, Inc., of Elmsford, N.Y.

Figure 3:
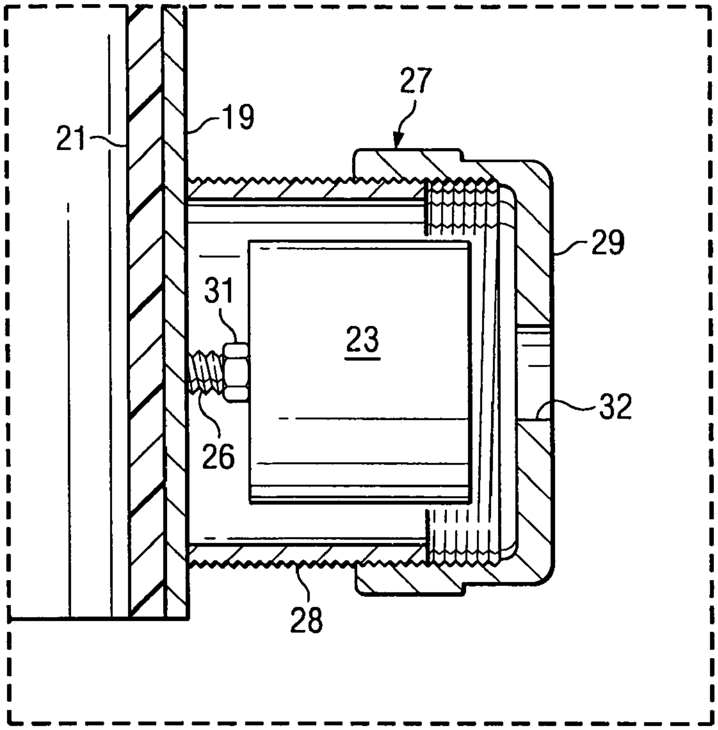
FIG. 3 is an enlarged fragmentary sectional view of a splash skirt and sensor for the roping detector in the embodiment of FIG. 2.

As best seen in FIG. 3, the sensor 23 is mounted on a threaded stud 26 and enclosed within a metal housing 27 on the side wall of the splash skirt. In the embodiment illustrated, the housing consists of a pipe nipple 28 which is affixed to the side wall at its inner end and a pipe cap 29 which is on the outer end of the nipple. The sensor is locked in place on the stud with a jam nut 31. Electrical connections are made to the sensor by leads (not shown) which pass through an opening 32 in the end wall of the cap.

Operation and use of the roping detector, and therein the method of the invention, are as follows. The baseline threshold of the sensor is set to a level corresponding to the magnitude of the vibration produced by the impact of a normal underflow discharge spray on the sidewall of the splash skirt. As long as the cyclone operates normally, the output of the sensor will not vary appreciably.

However, when the cone angle of the underflow discharge begins to decrease, as it does when the apex receives an increased solids loading, the intensity of sound decreases with the decreasing angle of impact as more material starts missing the splash skirt. The magnitude of the vibrations produced by the discharge decreases, and the output of the sensor likewise decreases. By monitoring that output, the onset of roping can be detected, and corrective action can be taken before the roping becomes a problem. As is well understood in the art, this effect can be refined by changing the splash skirt length or diameter to change the angle where the apex flow discharge misses the splash skirt.

Figure 4:
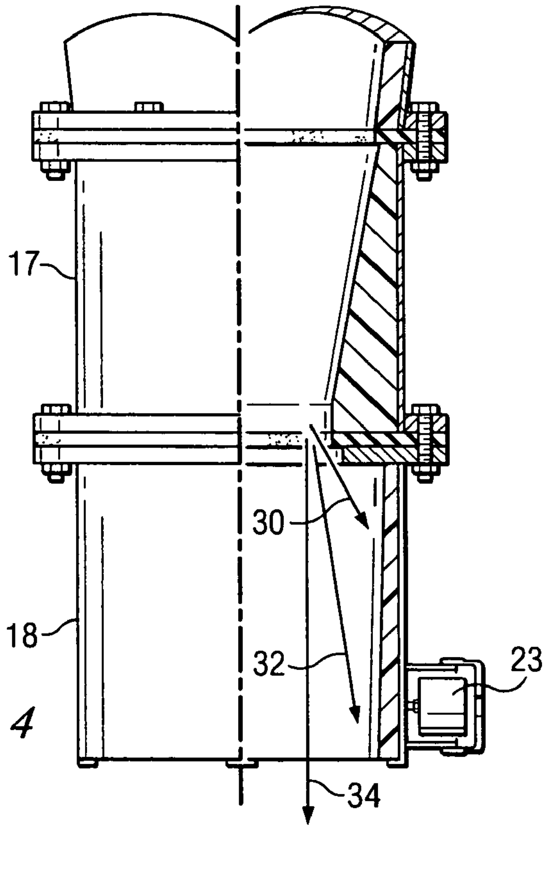
FIG. 4 is a partially sectioned view of a hydrocyclone showing the change in direction of the outer boundary of the underflow discharge as it progresses from normal conical flow to a roping condition.

FIG. 4 illustrates, in the partially sectioned view of a hydrocyclone, the change in direction of the outer boundary of the underflow discharge as it progresses from normal conical flow to a roping condition. The direction of arrow 30 illustrates the 20–30 degree conical output that characterizes normal flow. Under these conditions, a large portion of the underflow strikes the splash skirt 18, thereby producing a maximum amount of vibration and noise. The direction of arrow 32 illustrates an intermediate condition wherein the underflow begins to converge toward roping and the output's cone is less pronounced. Accordingly, less material strikes the splash skirt and the vibration and noise decrease. When an incipient roping condition is reached, as illustrated by the direction of arrow 34, substantially all underflow is released without striking the splash skirt. As a result, vibration and noise are materially reduced.

Figure 5:
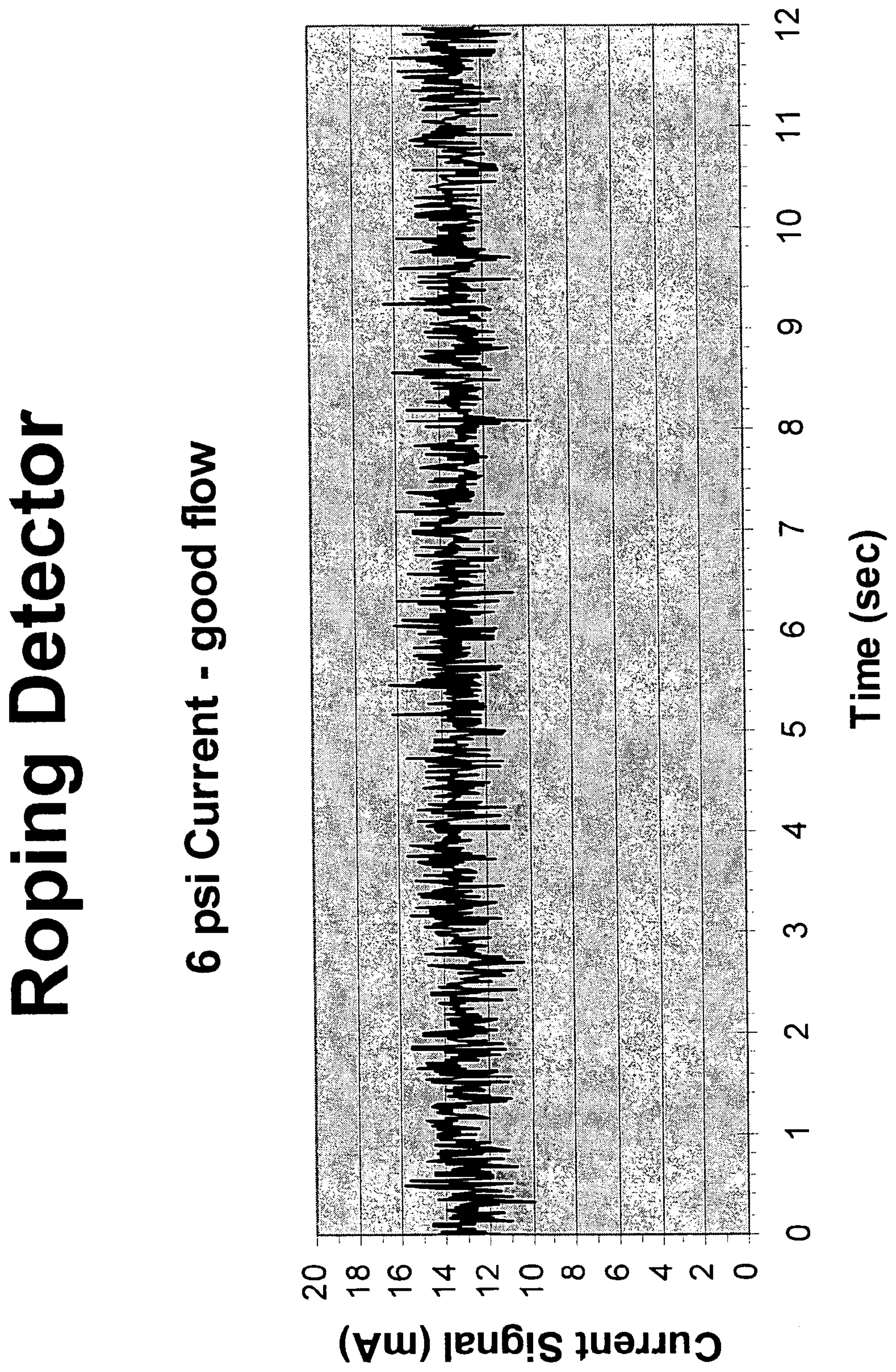
FIG. 5 is a diagram illustrating the output of an ultrasonic sensor applied to the skirt of a hydrocyclone according to the invention under normal conditions of operation.
Figure 6:
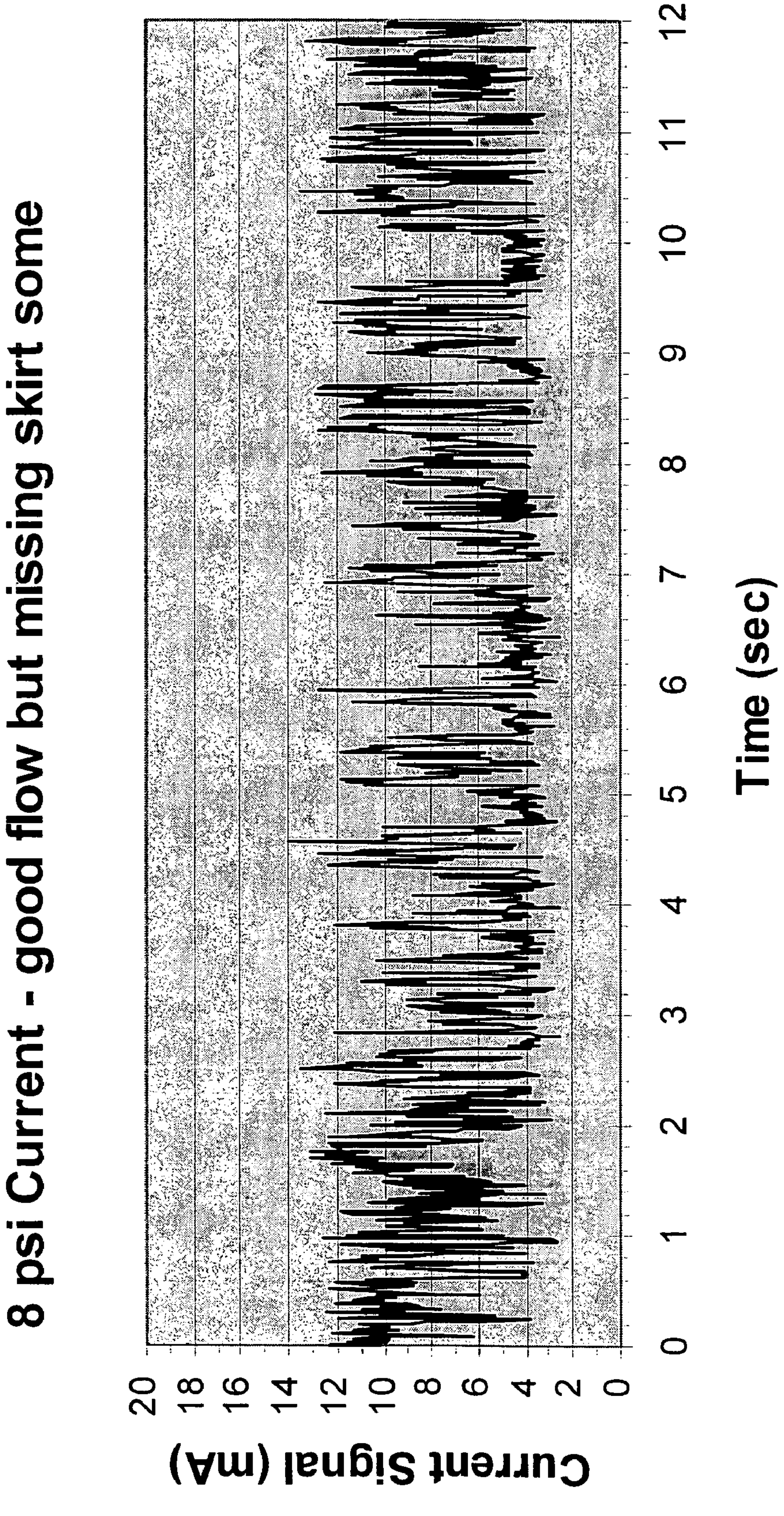
FIG. 6 is a diagram illustrating the output of the ultrasonic sensor when some of the underflow begins missing the splash skirt.
Figure 7:
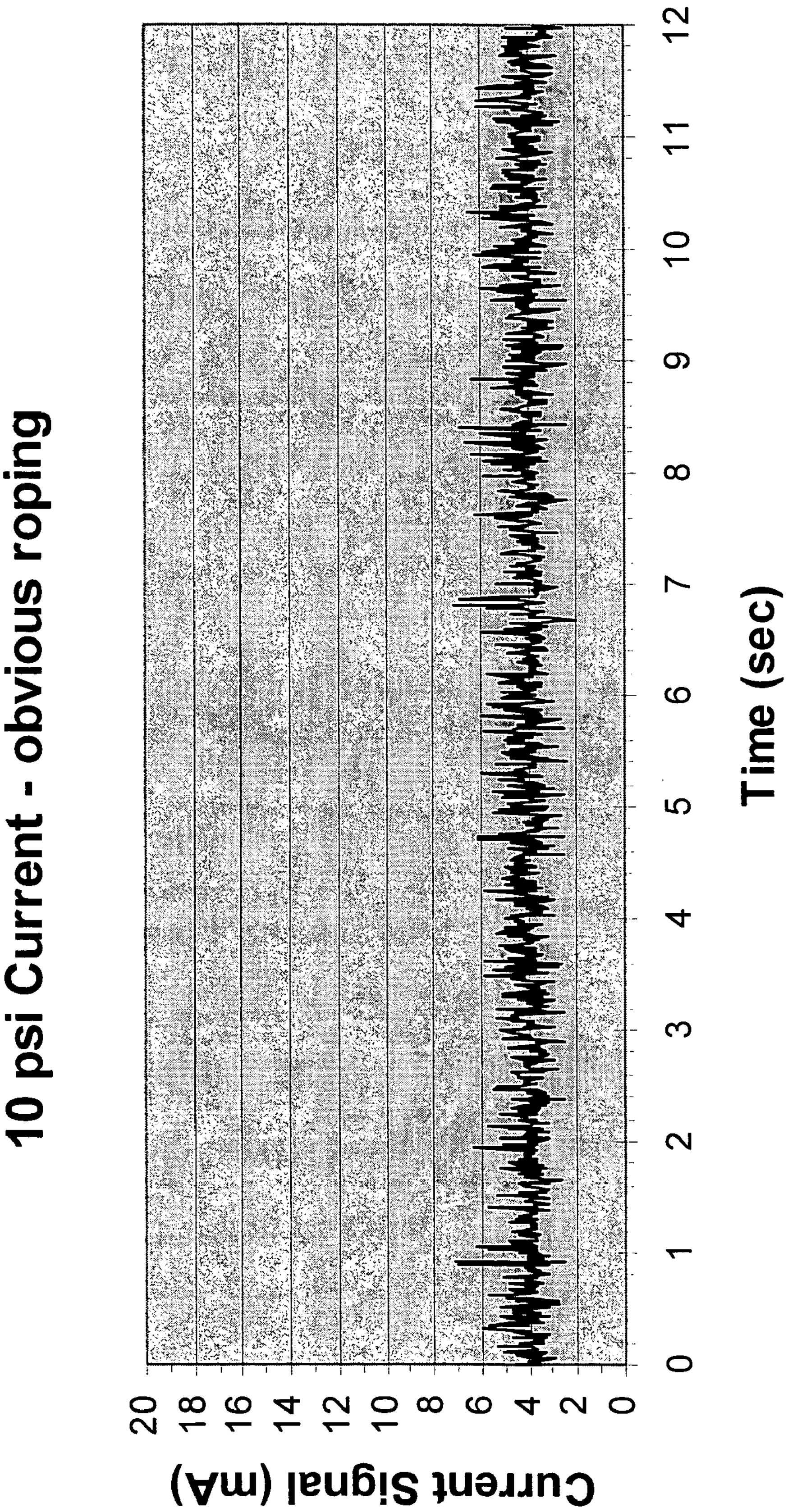
FIG. 7 is a diagram illustrating the output of the ultrasonic sensor when the underflow is roping.

FIGS. 5–7 illustrate the output of an ultrasonic sensor applied to the skirt of a hydrocyclone according to the invention under the three conditions illustrated in FIG. 4. Under normal conditions, shown in FIG. 5, the sensor's output is characterized by a substantially uniform level (for example 12–14 mA) that depends on flow rate, the physical characteristic of the equipment, and other variables related to the system. The sensor can be calibrated, if required, using this output level as the baseline threshold. As illustrated in FIG. 6, when some of the underflow begins missing the splash skirt, the vibrations and correspondingly the output of the sensor become more erratic and decrease with respect to the baseline level (3–12 mA in the example). Finally, as the underflow approaches roping, the output signal from the sensor drops materially to a lower, substantially uniform level (3–6 mA in the example). The variation in sensor output is therefore available to indicate the condition of flow and activate appropriate alarms or control features in a hydrocyclone system, as desired.

It is apparent from the foregoing that a new and improved roping detector and method have been provided. While only certain presently preferred embodiments have been described in detail, as will be apparent to those familiar with the art, certain changes and modifications can be made without departing from the scope of the invention as defined by the following claims.

What is claimed is:

1. A hydrocyclone, comprising:

a separation chamber including an apex adapted to produce an underflow discharge with a cone angle;

a splash skirt connected to the apex adapted to receive the underflow discharge; and a vibration sensor mounted on the splash skirt adapted to produce an output signal indicative of a variation of the cone angle of the underflow discharge;

wherein the vibration sensor produces an output signal relative to a baseline threshold set to a level corresponding to a magnitude of vibration produced by a normal impact of the underflow discharge on the splash skirt.

2. The hydrocyclone of claim 1, wherein said normal impact corresponds to a pre-determined cone angle.

3. The hydrocyclone of claim 2, wherein the vibration sensor is an ultrasonic sensor.

* * * * *